United States Patent
Cotter

(10) Patent No.: US 11,623,153 B2
(45) Date of Patent: *Apr. 11, 2023

(54) ONLINE VIDEO GAME SERVICE WITH SPLIT CLIENTS

(71) Applicant: Sony Interactive Entertainment LLC, San Mateo, CA (US)

(72) Inventor: Tim Cotter, Sunnyvale, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 16/808,313

(22) Filed: Mar. 3, 2020

(65) Prior Publication Data

US 2020/0197820 A1    Jun. 25, 2020

Related U.S. Application Data

(63) Continuation of application No. 15/981,143, filed on May 16, 2018, now Pat. No. 10,583,366, which is a continuation of application No. 15/145,727, filed on May 3, 2016, now Pat. No. 9,987,562, which is a continuation of application No. 14/172,069, filed on Feb. 4, 2014, now Pat. No. 9,333,433.

(51) Int. Cl.
  *A63F 9/24* (2006.01)
  *A63F 11/00* (2006.01)
  *G06F 13/00* (2006.01)
  *G06F 17/00* (2019.01)
  *A63F 13/86* (2014.01)
  *A63F 13/352* (2014.01)
  *H04L 69/04* (2022.01)
  *A63F 13/355* (2014.01)
  *H04L 67/131* (2022.01)

(52) U.S. Cl.
  CPC ............ *A63F 13/86* (2014.09); *A63F 13/352* (2014.09); *A63F 13/355* (2014.09); *H04L 67/131* (2022.05); *H04L 69/04* (2013.01)

(58) Field of Classification Search
  CPC ............................ G07F 17/32; G07F 17/3214
  USPC ...................... 463/20, 25, 31, 34, 40, 42, 43
  See application file for complete search history.

(56) References Cited

U.S. PATENT DOCUMENTS 5,558,339 A * 9/1996 Perlman .................. A63F 13/12
                                                          463/42
6,810,528 B1 * 10/2004 Chatani ................... A63F 13/12
                                                          725/109

(Continued)

*Primary Examiner* — Adetokunbo O Torimiro
(74) *Attorney, Agent, or Firm* — Penilla IP, APC

(57) ABSTRACT

A method for an online video game or application service system includes running a video game or application on an application host server at a data center, an uncompressed video stream being produced therefrom. The uncompressed video stream is encoded into compressed video stream, which is then transmitted over the Internet to an output client device of a user. The output client device decompresses the compressed video stream and displays live video on a screen. User control input transmitted from an input client device is delivered to the application host server. The user control input includes game or application commands. The input client device is associated with the user and is separate from the output client device. Responsive to receiving the game or application commands, the application host server generates a new uncompressed video stream.

20 Claims, 15 Drawing Sheets

(56) References Cited

U.S. PATENT DOCUMENTS

| | | | |
|---|---|---|---|
| 2004/0176168 A1* | 9/2004 | Tsao | A63F 13/335 463/42 |
| 2007/0220165 A1* | 9/2007 | Moorer | H04L 65/1059 709/231 |
| 2007/0271358 A1* | 11/2007 | Gaddy | H04N 21/440281 709/222 |

* cited by examiner

ONLINE VIDEO GAME SERVICE WITH SPLIT CLIENTS

CLAIM OF PRIORITY

The present patent application is a continuation of and claims the benefit of and priority, under 35 U.S.C. § 120, to U.S. patent application Ser. No. 15/981,143, filed on May 16, 2018, and titled "Online Video Game Service with Split Clients", which is a continuation of and claims the benefit of and priority, under 35 U.S.C. § 120, to U.S. patent application Ser. No. 15/145,727, filed on May 3, 2016, titled "Online Video Game Service with Split Clients", and issued as U.S. Pat. No. 9,987,562, which is a continuation of and claims the benefit of and priority, under 35 U.S.C. § 120, to U.S. patent application Ser. No. 14/172,069, filed on Feb. 4, 2014, titled "Online Video Game Service with Split Clients", and issued as U.S. Pat. No. 9,333,433, all of which are incorporated by reference herein in their entirety for all purposes.

TECHNICAL FIELD

The present disclosure relates generally to online video game services; more specifically to cloud computing or cloud gaming services that run video games on servers from remote data or hosting service centers in the cloud to a wide range of user devices.

BACKGROUND

Online or cloud video game services, also called video gaming on-demand, is a type of remotely-hosted video gaming that allows direct, on-demand streaming of video games and applications to players using a wide variety of computers, consoles, and mobile devices to display the game and input commands. In a typical online video gaming architecture, the actual video game or application program is executed remotely on one or more game servers, with a compressed interactive video stream being delivered over the Internet or other network directly to computers accessing the server through the user's client device. This type of architecture obviates the need for the user to purchase an expensive console or high-end client device having substantial processing power. Essentially, the user's client device (console, computer, etc.) is unimportant, as the remote server has the processing power to actually run the video game or application. The user only needs a relatively simple or "thin" client device to decompress the incoming video stream sent directly from the server, and transmit input commands/controls back to the server. The server then sends back the game's response to the user's input commands/controls.

The architectural components and configurations of remotely-hosted online game services have typically been costly and complex. For example, when hosting multiplayer, fast-action (i.e., "twitch") video games and applications, or when providing spectating services for such games, past approaches have utilized a large number of components and complex hosting service and streaming systems. Additionally, changes made to the look-and-feel of an online gaming service and programs has often necessitated changes or upgrades also be made to the user client device.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

Figure 1:
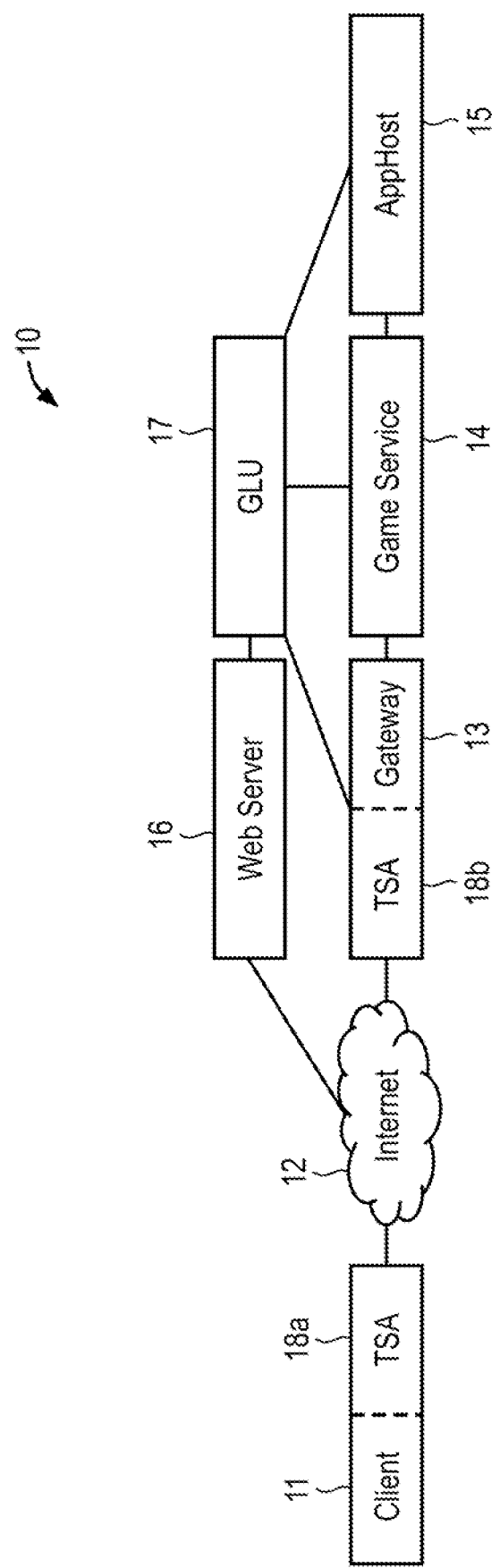
FIG. 1 is an example architectural diagram illustrating an online video gaming service.

In the following description, numerous specific details are set forth in order to provide a thorough understanding of the embodiments described. It will be apparent, however, to one having ordinary skill in the art that the specific details may not be needed to practice the embodiments described. In other instances, well-known apparatus or methods have not been described in detail in order to avoid obscuring the embodiments disclosed.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art.

The term "server" broadly refers to any combination of hardware or software embodied in a computer (e.g., a processor or a machine "instance") designed to provide services to client devices or processes. A server therefore can refer to a system of one or more computer processors that run a server operating system from computer-executable code stored in a memory, and which is provided to the user as virtualized or non-virtualized server; it can also refer to any software or dedicated hardware capable of providing computing services.

A "client" or "client device" generally refers a computer hardware device such as a PC, desktop computer, tablet, mobile, handheld, set-top box, smartphone, or any other general purpose computer (e.g., Microsoft Windows- or Linux-based PCs or Apple, Inc. Macintosh computers) having a wired or wireless connection to a public network such as the Internet. The connection allows the client device to access a service made available by a server. The term "client" may also refer to a computer program or software that runs on a hardware device. The term typically applies to programs or devices that are part of a client—server model.

A "split" client device refers to two or more client devices that have different logical functions. For instance, an output client device is a type of client that is dedicated to rendering received video data/streams on a screen or display. Thus, a typical output client device includes external display device for displaying one of the many digital images which comprise a movie or video game (i.e., a live video or moving picture) content. Example output client devices include a television, computer monitor, or any device capable of visually displaying video content.

Conversely, an input client device refers to any computing device capable of accepting user input commands and controls, and communicating those commands/controls to a streaming service, e.g., an online game hosting or streaming service. Both output and input client devices may further include the ability to decompress/decode compressed packet data received over a network connection. Both types of client devices may also incorporate hardware and/or software that encrypts/decrypts data received/sent over a network.

The term "real-time" refers to a level of computer responsiveness that a user senses as sufficiently immediate or that enables the computer to keep up with some external process (for example, to present visualizations of a game as it constantly changes responsive to user or player input). Thus, real-time is a mode of computer operation in which the computer (e.g., server) running a video game or application responds to user control input on a client device with very low round-trip latency, i.e., within 100 milliseconds or less, such that the user perceives that the game or application is responding instantly.

In one embodiment, a method, system, and computer program product is provided for online video gaming that relies upon logically splitting client devices into input client device and output client device types. In other words, input and output client devices are handled separately. Video games and applications run on an application host at a hosting service center. Specialized media application hosts are utilized for reading, storing, and playing back video streams. The video gaming architecture disclosed herein relies upon the same interface and uses the same hardware components for multiple purposes, including video gameplay, spectating, replay, picture-in-picture compositing, etc.

FIG. 1 is an example architectural block diagram illustrating one embodiment of an online video gaming service system 10. Video gaming service system 10 includes a plurality of interconnected components shown in the right-hand side of FIG. 1 which communicate with a client 11 over Internet 12. These components include a General Logic Unit (GLU) 17 which is connected with a web server 16, application host (AppHost) 15, game service 14, and a gateway 13 that includes a transport security agent (TSA) component 18b. Both TSA 18a, associated with client 11, and TSA 18b of gateway 13 provide transport layer security in the form of cryptographic protocols designed to provide secure communications over the Internet 12. TSA 18a & 18b each may run various protocols that ensure privacy between communicating AppHosts and their clients/users connected to the Internet. In one implementation, TSA 18a & 18b each include hardware and/or software for encrypting/decrypting data packets, forward error correction (FEC) for controlling errors in data transmission, and data filtering functions at the network interface.

GLU 17 provides the processing capability for all of the back-end management of user sessions which may include determining the identity of users connected to the service, credentials and accessibility of users, billing, subscriptions, authentication of users, etc. GLU 17 may also originate and handle special promotions and advertisements for subscribers and new customers. Web server 16, along with GLU 17, comprises another part of the back-end service. Web server 16 communicates with client 11 during login of the user, and is the component responsible for configuring the real-time service transmission path between client 11 and AppHost 15. Web server 16 and/or GLU 17 may also be configured to synchronize input and output client devices, as discussed in more detail below.

AppHost 15 is a server component that runs the actual video game or application for gameplay or use by the user associated with client 11. In one embodiment system 10 may utilize a large number of different instances of AppHost 15 that provide different functions and features available to users of the gaming service. Each AppHost generates one or more uncompressed video and/or audio streams that are compressed by an encoder (not shown in FIG. 1) before being delivered to client 11. Each of the AppHosts may generate video/audio streams in different ways, with different hardware requirements. For example, one AppHost instance may be configured to run multiple games or services, another may be configured to run a single video game or application for multiple players/users connected, another AppHost may be configured to run multiple instances of a web interface, and still other AppHosts may be configured for multiple connections with a single user. Regardless of the number or different types of AppHosts used, each AppHost 15 is coupled with one or more instances of game service 14. The interface between game service 14 and each AppHost 15 is the same irrespective of the type or configuration of the particular AppHost.

Game service 14 provides the proprietary game streaming service to client 11. Game service 14 may produce data, audio and video data for transmission to client 11 over Internet 12. It should be understood that each instance of game service 14 may comprise a single computer program, a portion of a program, or a number of programs working in concert. The program(s) may be implemented in hardware, firmware, software, computer program products, or combinations thereof. Note that there is no need or transport layer security protocols on game service 14 because game service 14 is already secure within the data center or hosting service center. Practitioners in the online gaming arts will appreciate that the architecture of system 10, wherein game service 14 resides on a separate component than AppHost 15, advantageously isolates game service 14 from exposure to third party application software running on AppHost 15. This arrangement eliminates the possibility of the game service 14 from being corrupted or compromised by malware, mishap, program malfunction, etc., of the game or application software running on AppHost 15.

Gateway 13, which incorporates TSA 18b, is a device that interconnects the local network connecting the online gaming service system components (e.g., components 14-17) with the network protocol of Internet 12 (e.g., Transmission Control Protocol/Internet Protocol (TCP/IP)).

It should be understood that system 10 may also include other components not specifically shown in FIG. 1. For instance, additional web servers, media servers, and specialized media clients may be included in different embodiments of system 10. In certain embodiments, these additional components may be located within the data center, or, in other embodiments, they may be located outside of the data center. By way of example, a media client may be provided outside the data center to produce third party video streams (e.g., Netflix®).

Figure 2:
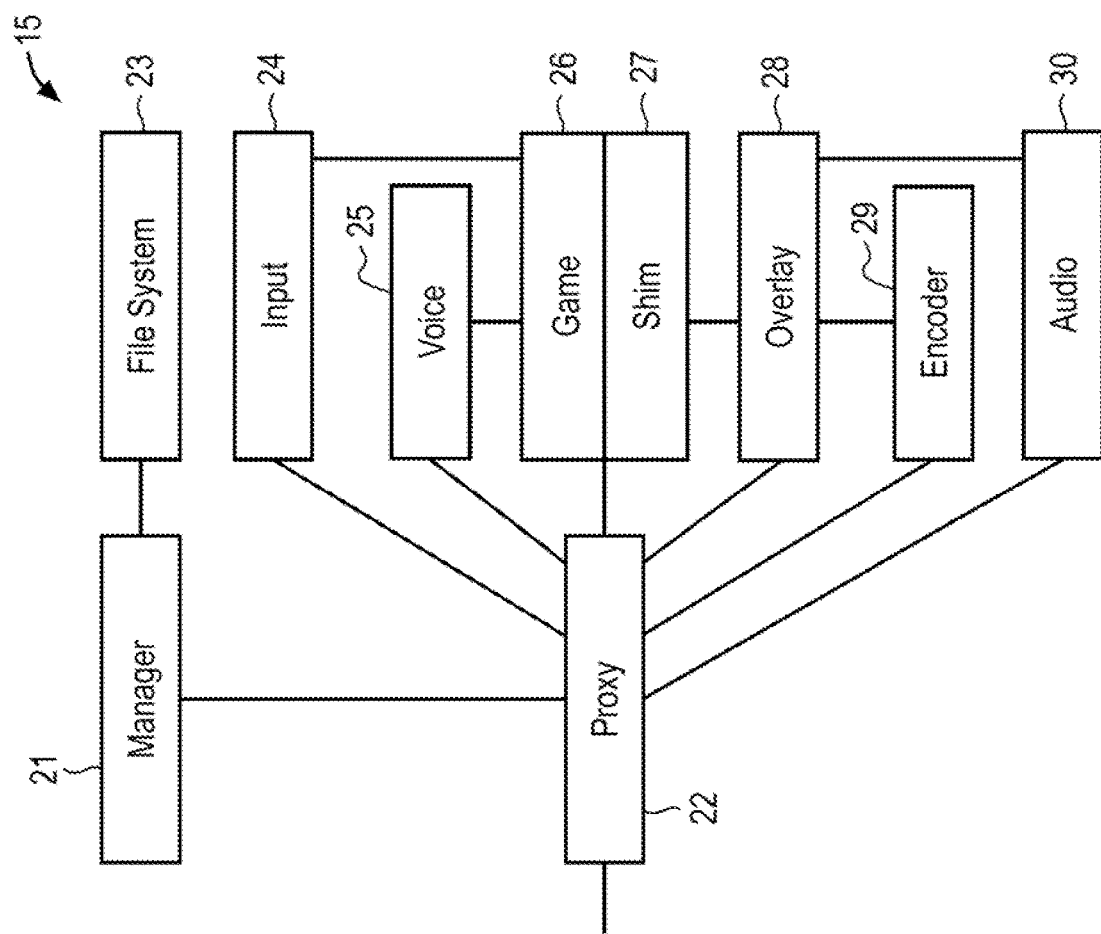
FIG. 2 is an example block diagram illustrating components of an application host.

FIG. 2 is an example block diagram illustrating components of one embodiment of AppHost 15. As shown, AppHost 15 includes a manager component 21 coupled with a file system 22 which stores copies of the file systems used by games or applications that run on AppHost 15. File system 2 provides the locations in memory where the game or application looks for specific data. Other components shown include Input 22 which processes user input commands for the game or application (e.g., mouse, keypad, touch screen, movement, etc.). Manager 21 and components 24-30 are each coupled to a proxy 22, which is the communication path into and out of AppHost 15. The use of proxy 22 thus provides added security for AppHost 15.

Voice component 25 processes voice inputs and commands received, and may produce one or more output audio streams for delivery to connected client devices. Game 26, shim 27 and overlay 28 components provide processing capability that allows the service to modify a particular game or application that runs on AppHost 15 by inserting code between the game or application and the operating system's (OS) Dynamic Link Library (DLL). An overlay is presentation content that is added on top of the game or application video stream. When making modifications, audio, video, and data overlays for a particular game or application are "shimmed" (i.e., made to fit) into that game or application. An example of an overlay for a game is a picture-in-picture feature, wherein a specified video (e.g., a spectating window) is shown appearing on top of the video content of a game or application that is running. In one embodiment, the overlay becomes a client which communicates with its own instance of the game service. A spectating stream, for example, may be provided from a separate media AppHost. Another example of an overlay is when a user is notified that he or she has got mail, or when a buddy wishes to join a game or application being played or used. In another embodiment, the overlay can be integrated directly into the game or application. It is appreciated that the features and methods of operation described above may be coordinated by GLU 17.

Encoder 29 is a hardware and/or software compression unit that takes the raw, uncompressed video game or application stream and outputs compressed streaming video. Audio component 30 generates the audio output streams for output to the client device(s).

Figure 3:
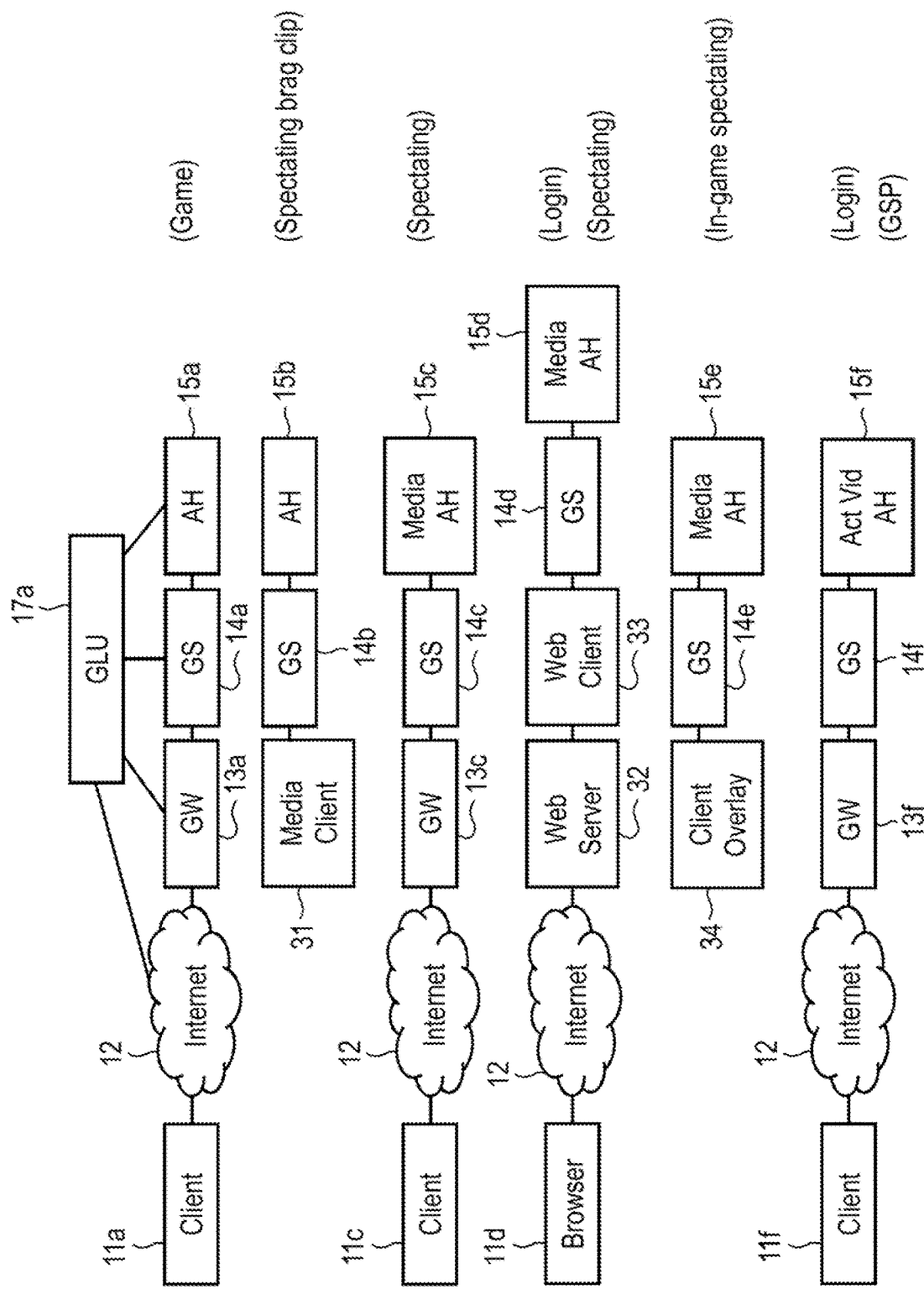
FIG. 3 illustrates various example block diagrams showing how different system components utilized for different hosting or user activities.

FIG. 3 illustrates various example block diagrams showing how different system components utilized for different hosting or user activities. Considering each from top to bottom, in the scenario where a user of client 11a is playing a game, AppHost 15a running the game communicates with client 11a over Internet 12 through gaming service 14a and gateway 13a. (TSA components are not shown in client 11a and gateway 13a for simplicity.) GLU 17 coordinates all of the gameplay operations and communications between client 11a & AppHost 15a.

When a user is spectating on a brag clip, a media client 31 is utilized to replay a stored video segment. A brag clip is a video segment saved to storage from a previous game played by that user, or another user. Media client is shown communicating the video segment to AppHost 15b through an instance 14b of the game service.

Spectating on another player or user may also be achieved by streaming a stored video stream from media AppHost 15c through game service 14c and gateway 13c to client 11c. Login of a user/client or spectating is also shown in the example of FIG. 3 occurring from a browser 11d application through Internet 12 connected to a specialized media AppHost 15d through web server 32, web client 33, and instance 14d of the game service. As discussed above, in-game spectating, where one user spectates on another user while simultaneously playing a game, may be achieved through the use of a client overlay 34 provided to media AppHost 15e through game service 14e.

In the final example shown at the bottom of FIG. 3 a system component arrangement is illustrated for a game service portal (GSP) login operation, where one or more users login to the gaming service interface. As shown, an active video AppHost 15f may be utilized for handling login activity of one or more clients 11f. Note that although only a single AppHost is show in each the examples of FIG. 3, it should be understood that multiple AppHosts, comprising a plurality of servers, may be utilized to generate many separate video streams.

Figure 4:
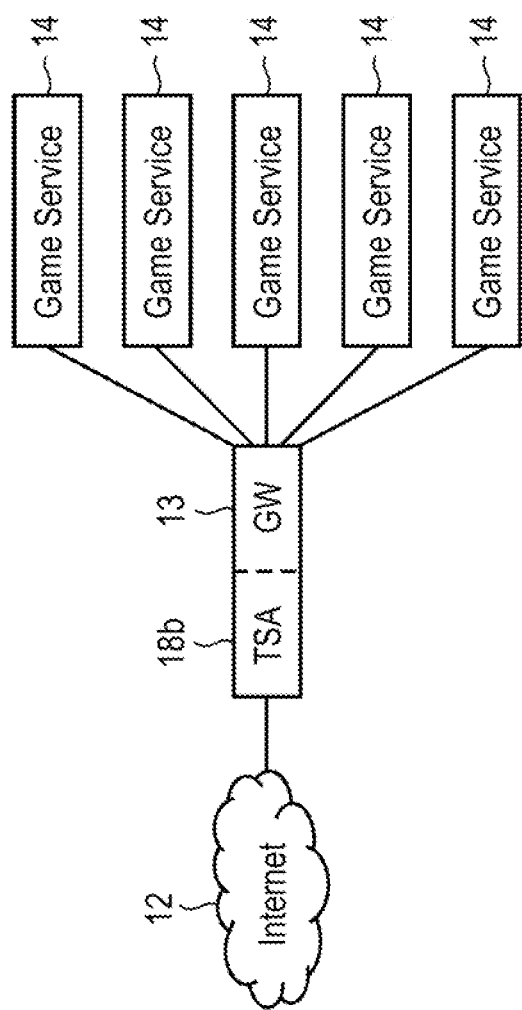
FIG. 4 is an example block diagram illustrating a single gateway device communicating with multiple different instances of a game service.

FIG. 4 is an example block diagram illustrating a single gateway device 13 communicating with multiple different instances of a game service 14. There is no logical limit to the number of game instances (connected to corresponding AppHosts) utilized in system 10. TSA 18b provides a secure interface between gateway 13 and Internet 12. Because TSA 18b performs all of the encryption/decryption necessary for transmissions over Internet 12, each of the instances of game service 14 do not need to perform those functions.

Figure 5:
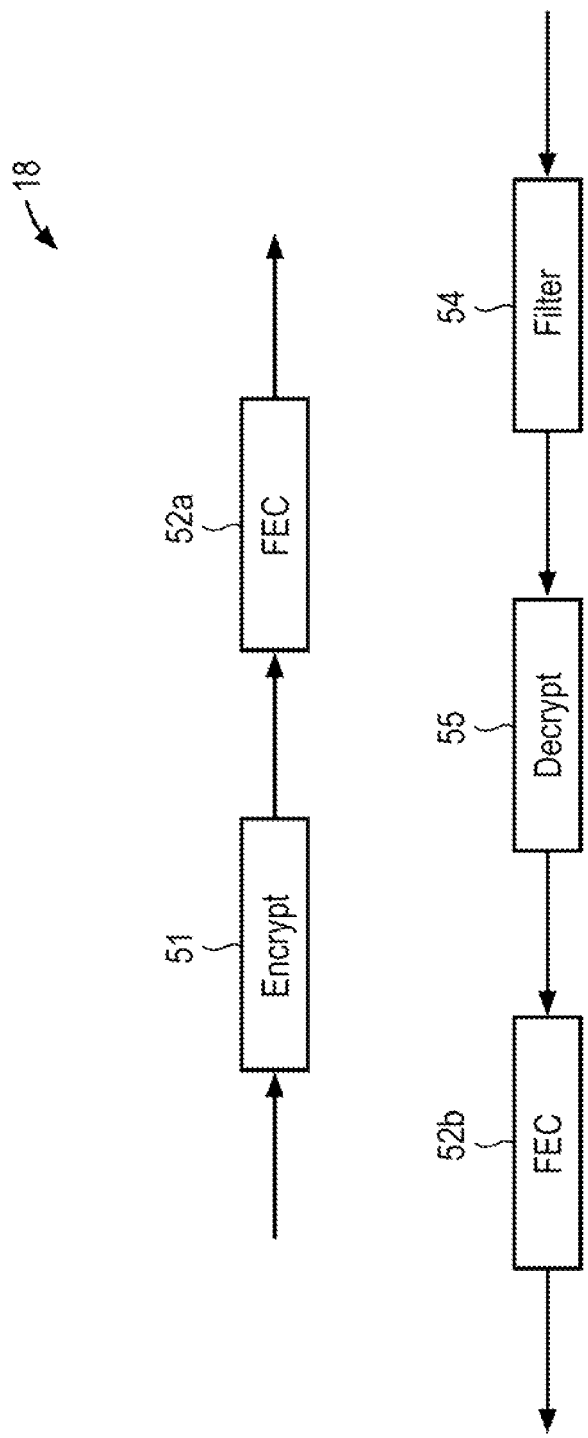
FIG. 5 is an example block diagram with one portion illustrating an outgoing data packet flow from the service toward the Internet, and another portion showing an incoming data packet flow on the client device side.

FIG. 5 is an example block diagram of gateway 18. One portion of gateway 18 (top half of FIG. 5) illustrates an outgoing data packet flow, e.g., from the service toward the Internet. As shown in this embodiment, outgoing data packet streams are encrypted by Encrypt unit 51, followed by forward error correction by FEC unit 52a. The other portion (bottom half of FIG. 5) illustrates an incoming data packet flow, e.g., from the Internet toward the client. Incoming data packets are first filtered (for addressing, flow numbering, etc.) by Filter unit 54, followed by decryption at Decrypt unit 55, and then forward error correction by FEC unit 52b. Practitioners in the art will appreciate that on the client side, FEC may be optionally disabled for outgoing flows sent from the client over the Internet.

Figure 6:
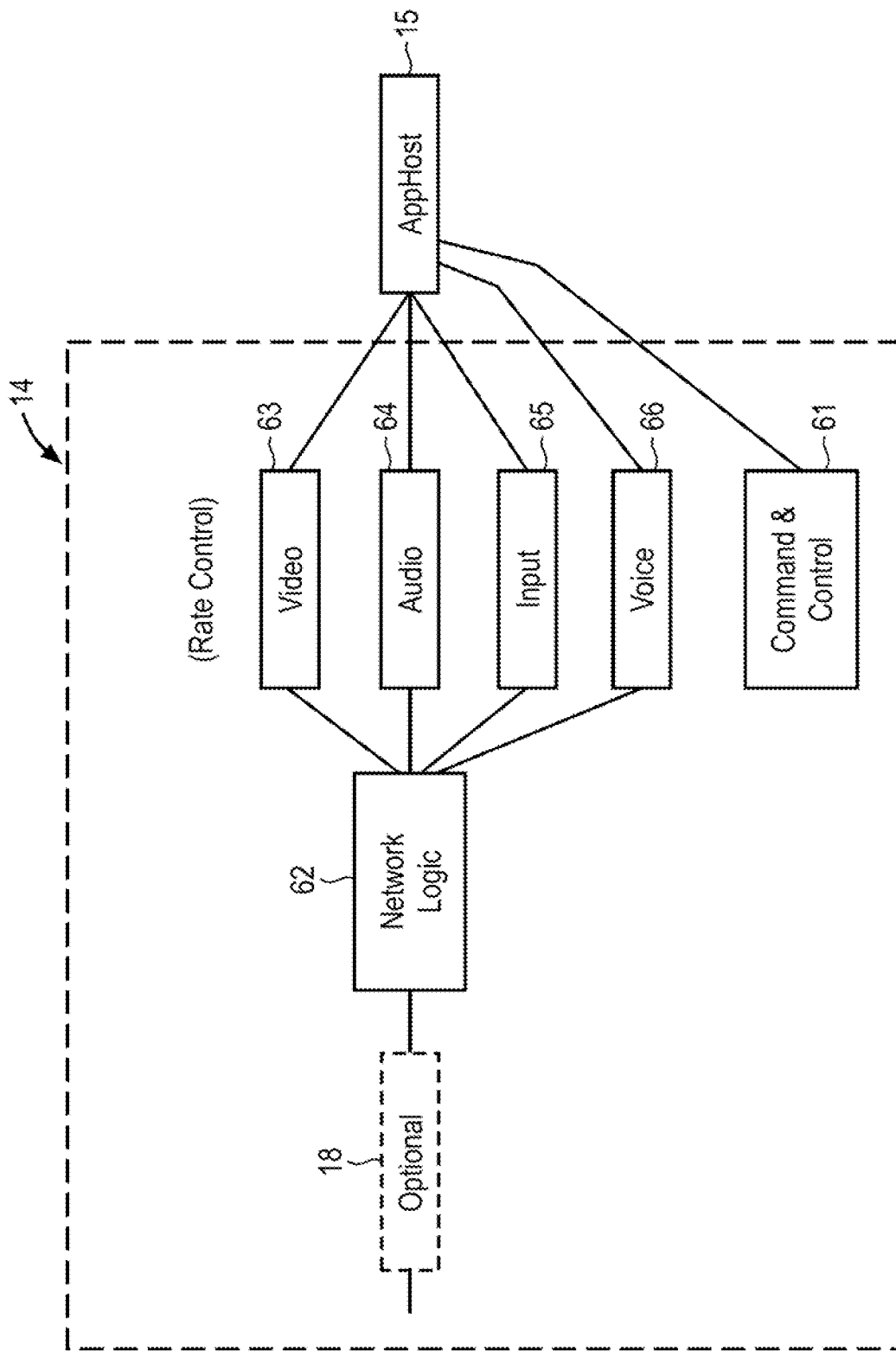
FIG. 6 is an example block diagram illustrating components of a gaming streaming service.

FIG. 6 is an example block diagram illustrating components of a gaming service 14. In this example, game service 14 is shown connected to a single AppHost 15, which is a normal configuration for system 10. In other embodiments, a single game service 14 may be connected to multiple AppHosts. In other words, there is no limitation on the number of AppHosts 15 that a single game service 14 communicates with. For instance, each of the components 63-66 for respective rate control of video, audio, input, and voice streams may be connected with one or more separate AppHosts 15. By way of example, the input stream may be connected to one server, the voice stream to another server, and so on. Each of components 63-66 is shown coupled to Network Logic 62, which interconnects with the data center network or gateway device. Note that an optional TSA 18 is shown included in game service 14 for certain embodiments where game service connects directly to the Internet. Command & Control unit 61 manages and controls operations within game service 14.

Figure 7:
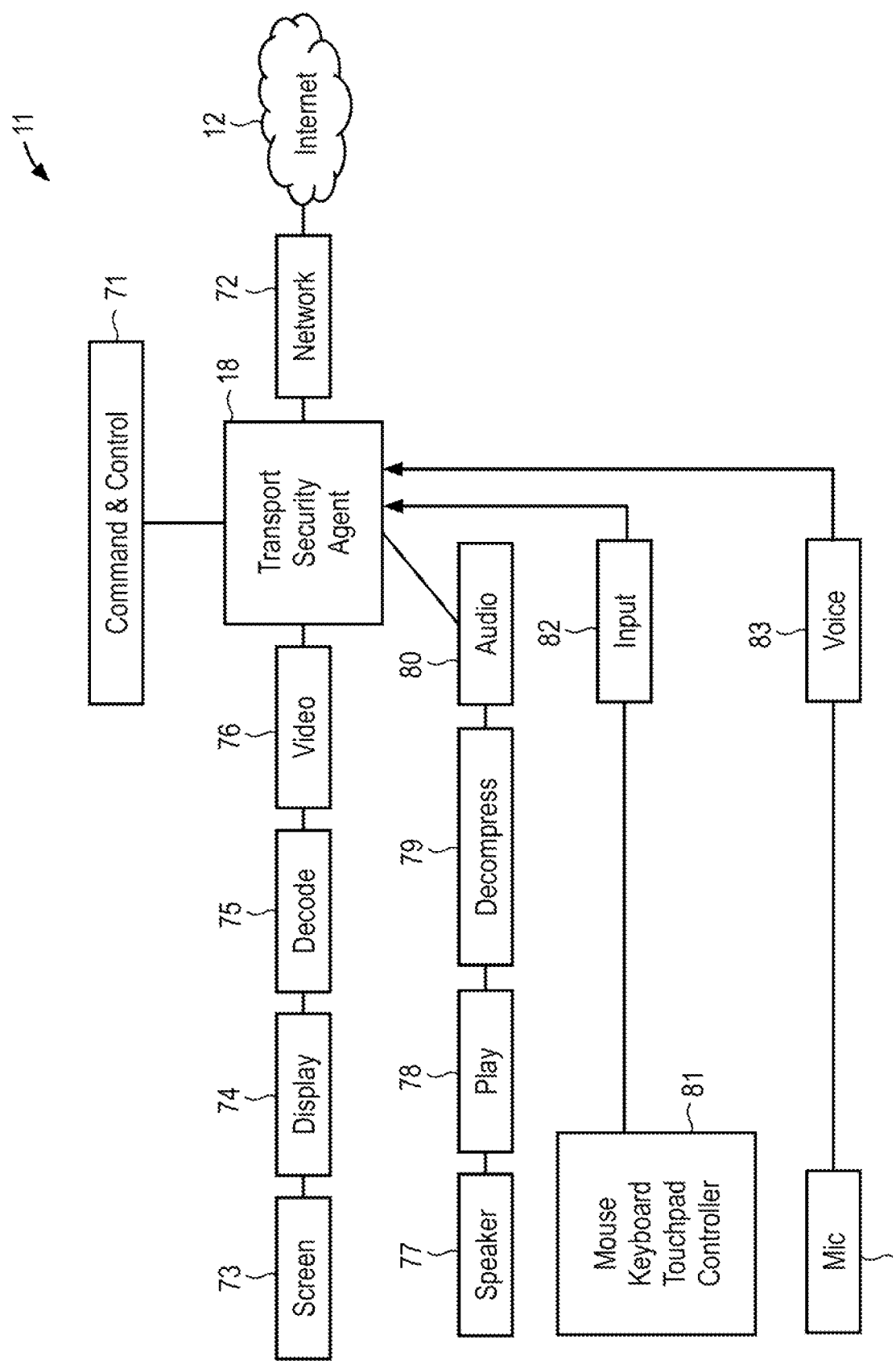
FIG. 7 is an example block diagram illustrating components of a client device.

FIG. 7 is an example block diagram illustrating components of a typical client device 11. As shown, video/audio streams transmitted over Internet 12 may pass through a network interface 72 before being received by Transport Security Agent 18, which may decrypt the incoming streams. Command & Control unit 71 controls and manages all operations of client 11. Incoming video streams may be processed by video unit 76 before being decoded by decoder 75. Display driver unit 74 presents the video for viewing by the user on screen 73. Similarly, incoming audio streams may follow a path through audio unit 80, decompressor 79, and player 78, which generates the audio signals output on speaker 77.

Command and control input may be received from the user via a variety of input devices. For example, block 81 shows a number of conventional input devices, including mouse, keyboard, touchpad, and controller (e.g., joystick, buttons, etc.) devices. Input unit 82 may process the signals generated by these various devices before transmission over Internet 12. Client device 11 is also shown including a microphone 84 that may receive voice input, which is processed by voice unit 83 before being sent over the Internet.

It is appreciated that client 11 shown in FIG. 7 is an example of a typical unified client device; that is, one capable of both input and output functionality. In accordance with the split client concept of the present disclosure, client devices may logically function only as input client devices, or only as output client devices. For instance, a web-enabled television or display monitor may be treated by the gaming system as an output client device, and would not include components 81-84 of FIG. 7. Other clients, such as a handheld video game controller may function solely as an input device, and would not include any of components 73-80. Other types of clients, such as a tablet computing device, notebook computer, smartphone, etc., may function as either an input client device, or as an output client device for a given game or application session.

Figure 8A:
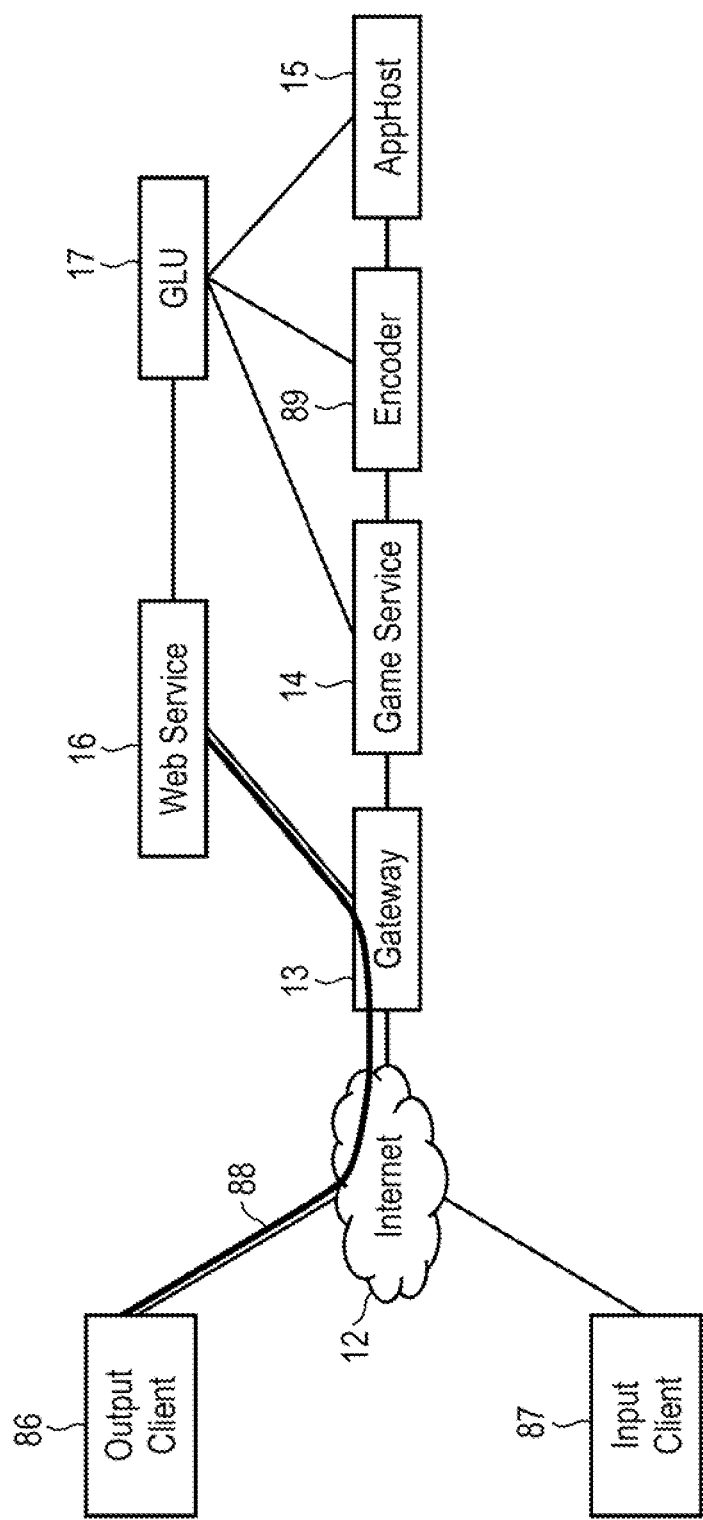
FIG. 8a-8c show block diagrams that illustrate various example methods of operation for an online video gaming service configured to communicate with split clients.
Figure 8B:
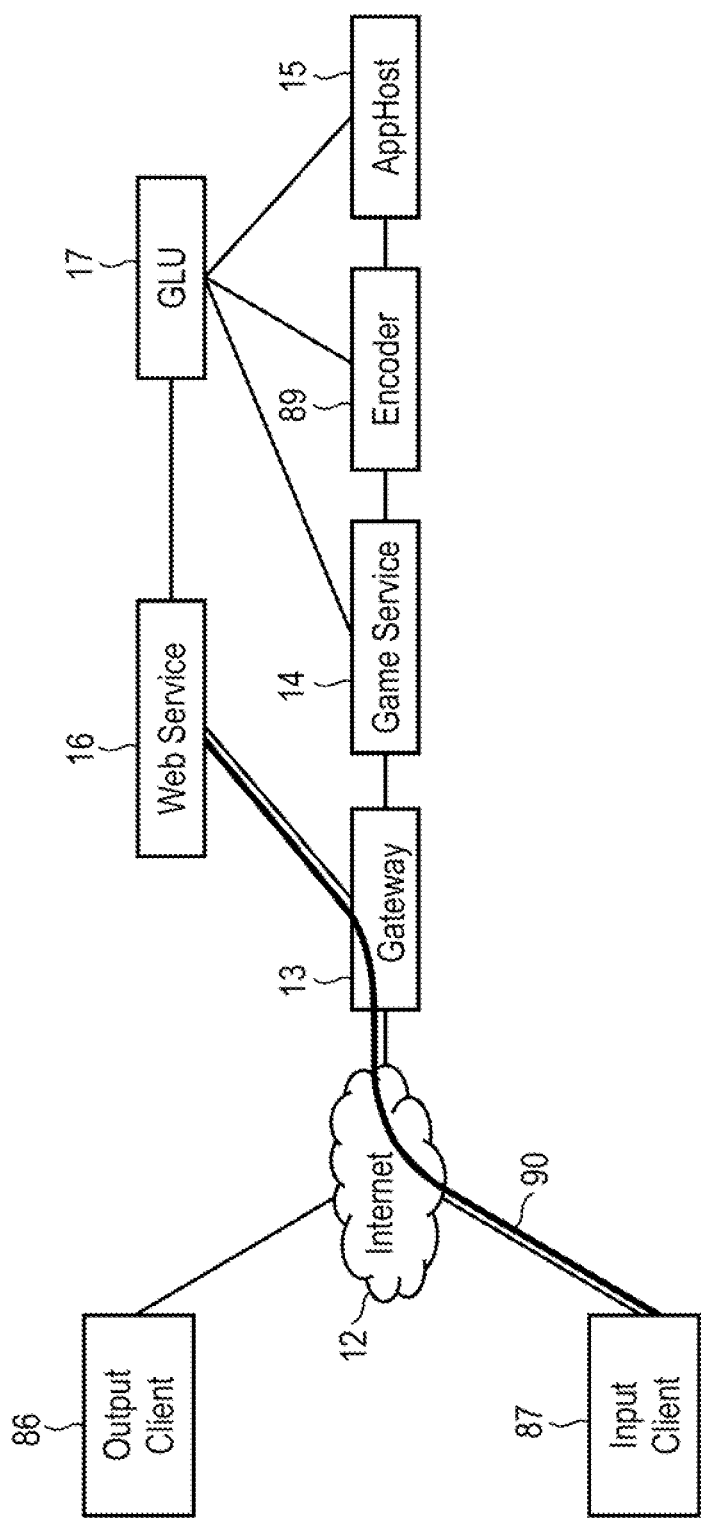
Figure 8C:
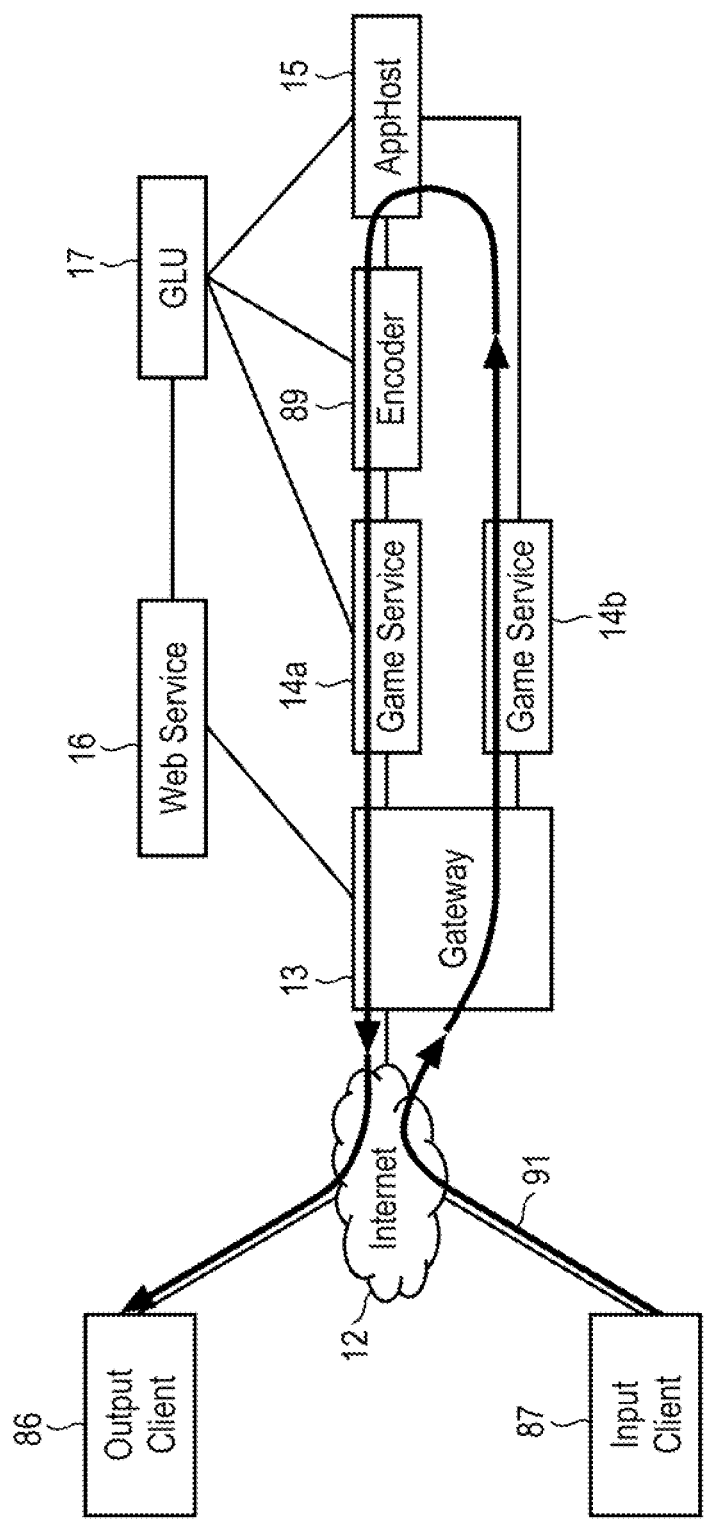

FIGS. 8a-8c show several block diagrams that illustrate various example methods of operation for an online video gaming service configured to communicate with split clients. FIG. 8a shows the system of FIG. 1 with split client devices, which includes output client 86 and input client 87, both of which communicate with the online gaming service system. The highlighted transmission path 88 shows output client 86 (e.g., a web-enabled TV) powered-on and running an application that connects it with web service 16. Prior to input client 87 logging onto the gaming service, web service 16 may stream video/audio advertisements or other promotional video/audio streams to output client 86. These streams may continue playing on output client 86 until the user logs into the system via input client 87 (e.g., smartphone or video game controller).

FIG. 8b shows input client 87 connected with web service 16 via transmission path 90 to log into the system. In one embodiment, the identity of the user is automatically authenticated through the registered identification (ID) of input client device 87. Alternatively, the user may logon using a conventional keypad to enter user ID/password information. Other methods of authenticating the user of input client 87 may also be used, e.g., voice identification, fingerprint recognition, facial recognition, etc. Note that account credentials may be established by prior communications with the online gaming service system.

In one embodiment, synchronization of the input client 87 and output client 86 is handled by GLU 17 through web service 16. For example, GLU 17 may prompt the user to point a camera of input client 87 (e.g., a smartphone or tablet) at output client 86 to read a Quick Response (QR) code, which is a type of machine-readable optical label, displayed on the screen. Input client 87 sends the QR code it imaged to web service 16 and GLU 17, which then matches the respective input and output clients 87 & 86 and binds them together for the game or application session. In another embodiment, synchronization may be accomplished through the playing of a series of audible sounds or musical notes. For instance, a pattern of notes may be communicated from web service 16 to output client 86, which plays them out through a speaker to input client 87. Input client 87, in turn, receives or records the sound pattern and communicates the same back to web service 16. In this manner, the sounds or note patterns may provide an authentication signature that can be used by the system to bind input client 87 to output client 86.

In still another embodiment, synchronization of input and output client devices may occur through the playing of a simple electronic game, e.g., the memory game known as Simon. For example, each instance of output client device 86 may show a different sequence of buttons for the user to press on their associated input client device 87. Persons of skill in the arts will appreciate that a variety of other methods may be used to accomplish synchronization of input and output client devices (e.g., challenge questions, captchas, etc.).

FIG. 8c shows the playing of a game or application via a pathway 91 by a user who enters interactive input via client 87, which input is communicated to AppHost 15 over Internet 12, and through gateway 13 and game service 14b. In this scenario, the user is playing a game or using an application with the respective input and output clients 87 & 86 being located in the same room. AppHost 15 responds to the interactive input received from input client 87 and generates appropriate video/audio streams that are encoded by encoder 89 and delivered through game service 14a, gateway 13, and over Internet 12 to output client 86. Note that in this configuration, output client 86 and input client 87 each have their own instance of the game service 14, which connect with gateway 13 through separate ports. Both instances 14a & 14b communicate with the same AppHost 15 that is running the game or application.

Figure 8D:
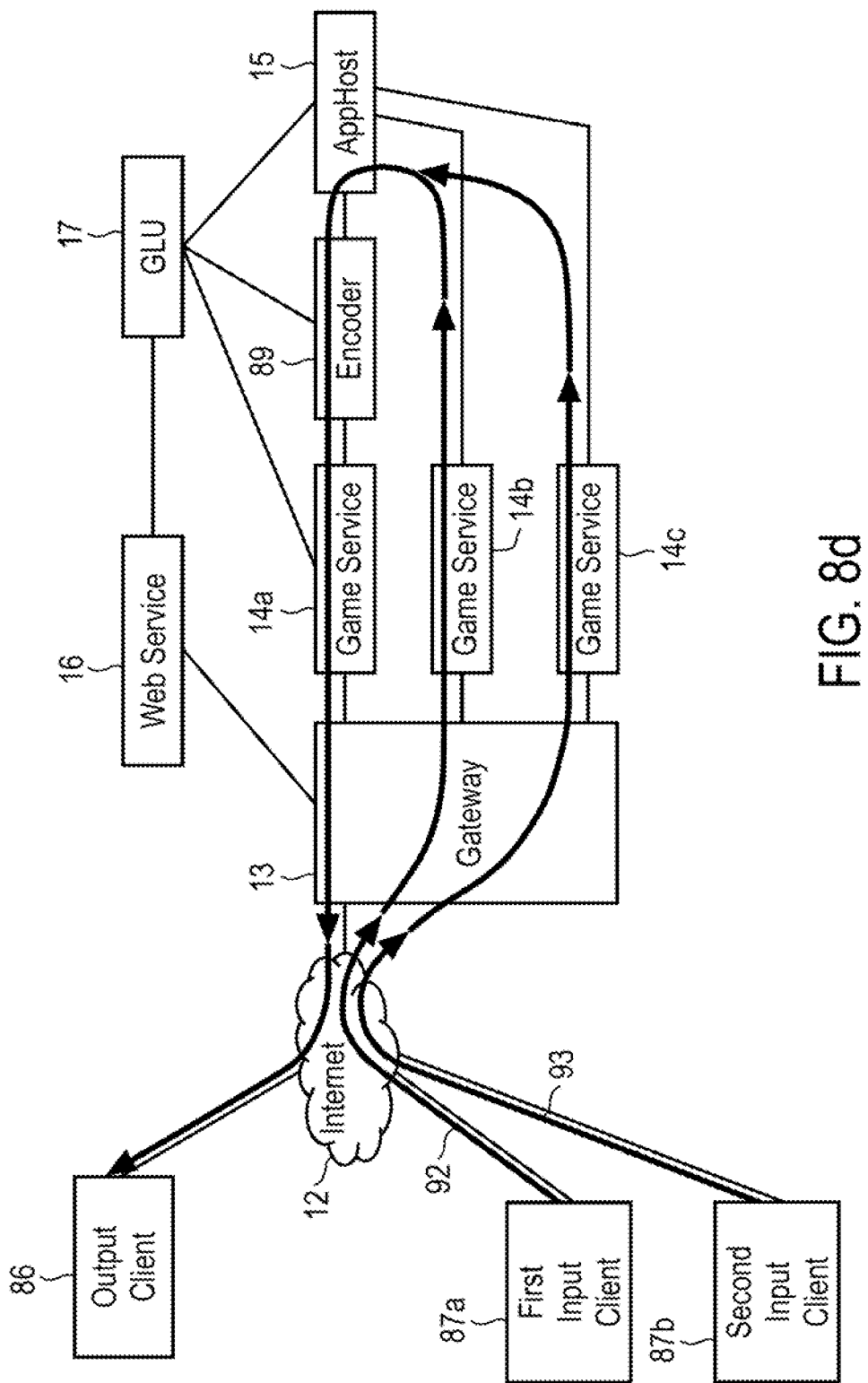
FIG. 8d is a block diagram showing another example method of operation for an online video gaming service configured to communicate with split client devices in a scenario wherein two players are located at the same room viewing the same output device.

FIG. 8d is a block diagram showing another example method of operation for an online video gaming service configured to communicate with split client devices in a scenario wherein two players/users are located at the same room. Both players/users are watching the game or application play out on output client 86, with each person providing interactive input on their respective first and second input client devices 87a & 87b. Input from client 87a is transmitted along path 92 over Internet 12, through gateway 13 and game service 14b to AppHost 15. Similarly, interactive input from client 87b is transmitted along separate path 93 over Internet 12, through a different port of gateway 13 and through game service 14c to AppHost 15. The return path of the compressed streaming video/audio from AppHost 15 to output client 86 is the same as in the previous example of FIG. 8c.

By way of example, in FIG. 8d the two players may be playing the videogame Lego Batman, with the first player playing the role of Batman and the second player playing the role of Robin. The first player may log into the system and send an invitation through the game service user interface to invite another player to join in the game. The two clients, 87a & 87b, and the output client 86 are synchronized and bound or attached to the same AppHost 15 for the entirety of the gaming session.

Note that in the examples shown in FIGS. 8c & 8d, once the real-time connections with the input and output clients has been established, web service 16 and GLU 17 remain in the background until an event occurs that requires their further involvement (e.g., user changes the game, the game crashes, network connection fails, etc.).

Practitioners in the art will appreciate that one advantage of the use of split clients, each with their own instance of game service 14, as shown in FIG. 8c, is that the respective input and output clients 87 & 86 may be communicating with the system over different networks (e.g., cable, satellite, 3G wireless, etc.), with each network having different requirements and demands.

Figure 8E:
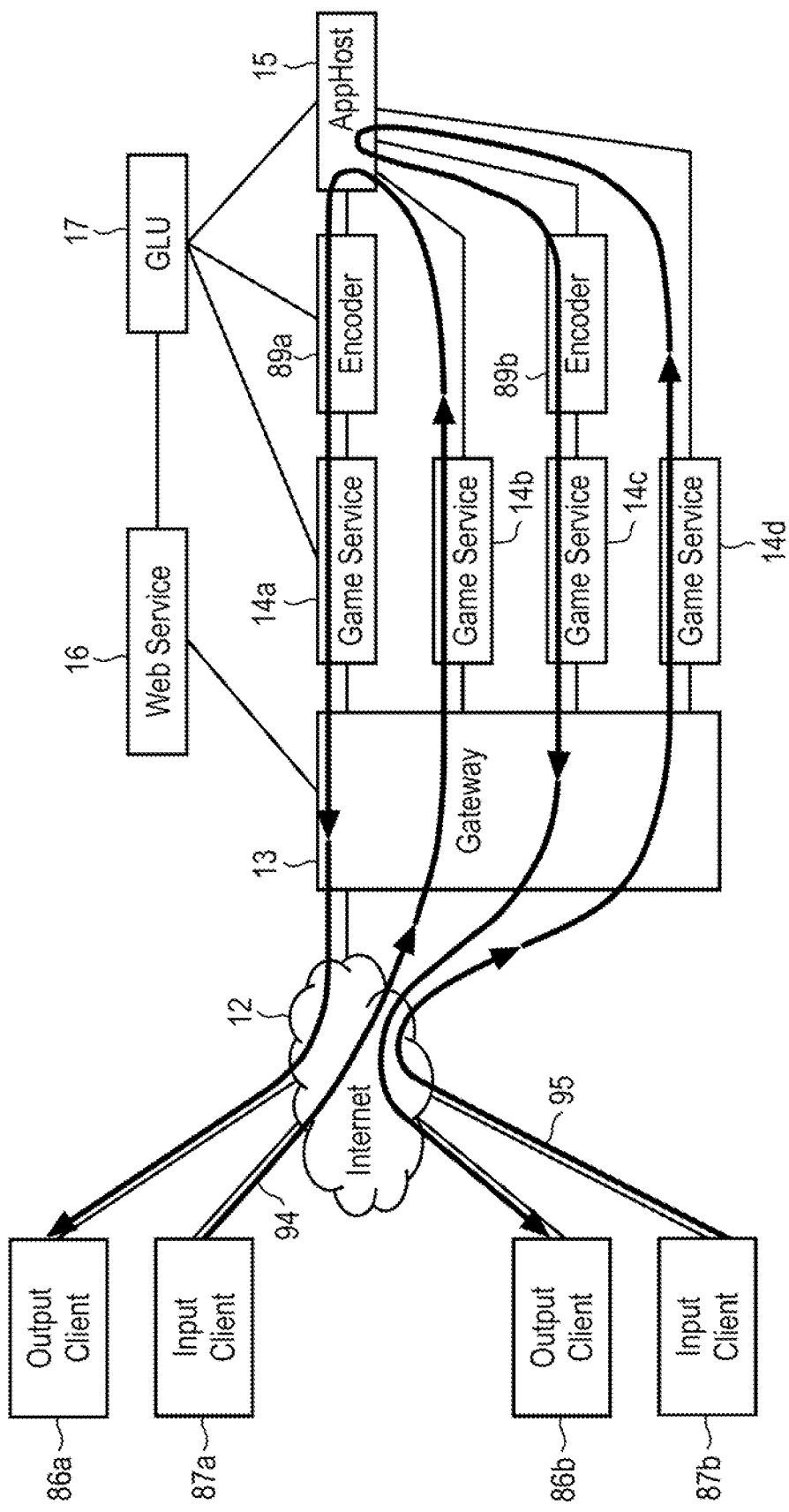
FIG. 8e is a block diagram showing another example method of operation for an online video gaming service configured to communicate with split client devices in a scenario wherein two players are located in different places, or viewing different output devices.

FIG. 8e is a block diagram showing another example method of operation for an online video gaming service configured to communicate with split client devices in a scenario wherein two players are located in different places. In this example, player 1 ("Nick") and player 2 ("Ben") are friends or buddies who may be playing the same game (e.g., Lego Batman) in different hotel rooms, or other different remote locations. Accordingly, each player has their own associated input and output client devices. For example, Nick may be playing the game using input client 87a and watching the gameplay on output client 86a, while Ben may be playing the game on input client 87b and watching the gameplay on output client 86b.

Nick is communicating with AppHost 15 via pathway 94, while Ben communicates with the same AppHost 15 via pathway 95. Each pathway has a separate encoder instance for compressing the respective streaming video generated by AppHost 15 sent to the two separate output clients. In other words, a separate encoder is used for each output client device. For instance, encoder 89a encodes streaming video sent from AppHost to output client 86a, and encoder 89b encodes streaming video sent from AppHost to output client 86b. Communications along the respective pathways for each player also have separate instances of game service 14 assigned to the input and output flows. That is, transmissions from input client 87a to AppHost 15 pass through game service 14b, and streaming video generated by AppHost 15 for transmission to output client 86a pass through game service 14a. Likewise, transmissions from input client 87b to AppHost 15 passes through game service 14d, and streaming video generated by AppHost 15 for transmission to output client 86b passes through game service 14c.

Figure 8F:
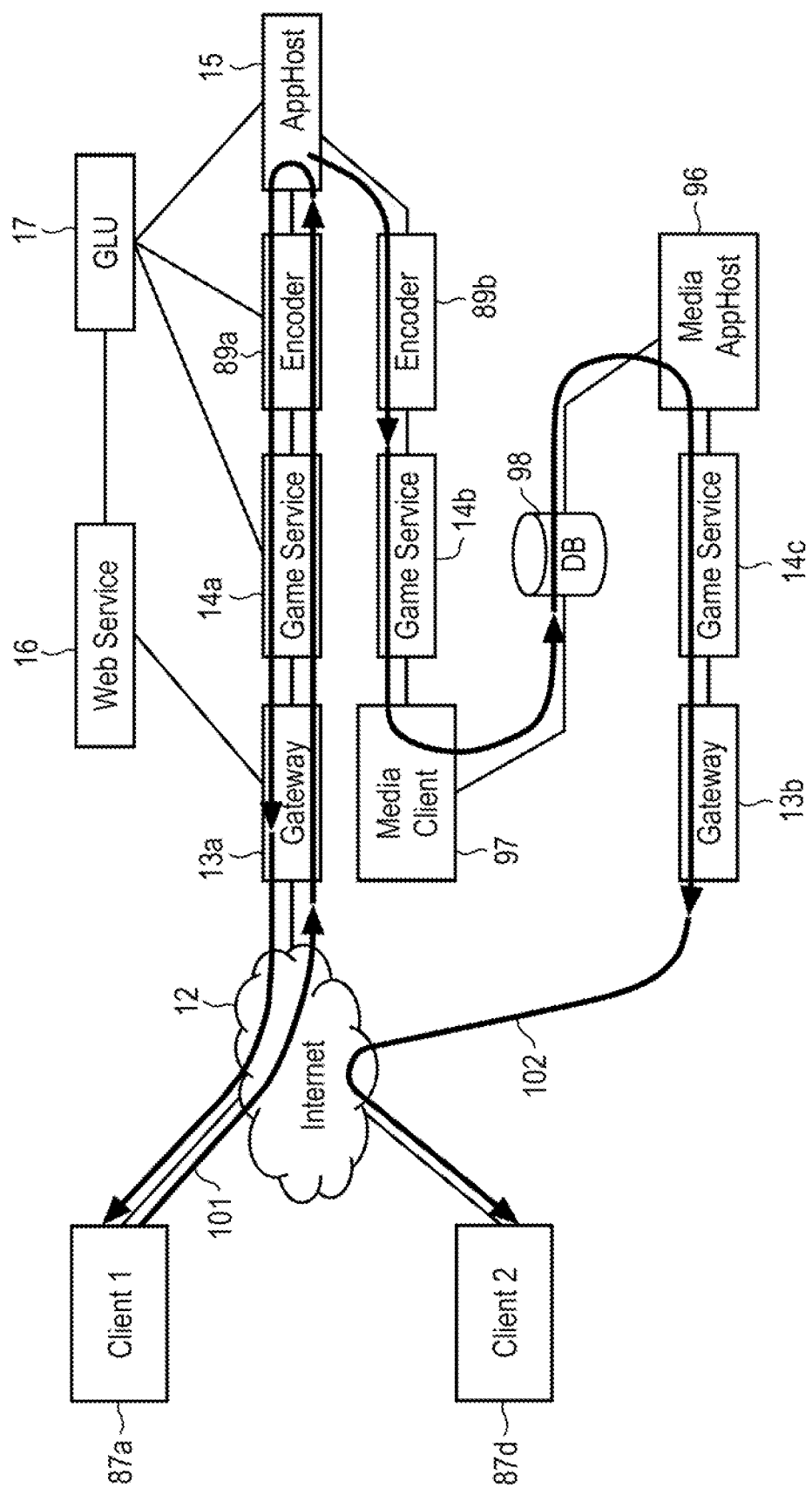
FIG. 8f is a block diagram showing still another example method of operation for an online video gaming service in a scenario wherein one player is playing a game and another person is spectating on that game.

FIG. 8f is a block diagram showing still another example method of operation for an online video gaming service in a scenario wherein one player (Nick) is playing a game using a first client device 87a, and another person (Ben) is spectating on, i.e., watching, that game using a second client device 87d. Note that in this example, client 87a may comprise separate input and output client devices, or a standard unified client device. Transmission pathway 101 is the round-trip communications path for interactive input from client 87a to AppHost 15 through gateway 13a, game service 14a, and streaming video from AppHost 15 through encoder 89a, game service 14a, and gateway 13 to client 87a over Internet 12.

The spectating pathway 102 is a one-way path for video/audio streamed from AppHost 15 through a separate encoder 89b and game service instance 14b to a Media Client 97, which writes the streaming video/audio to storage (e.g., disk memory), shown as database 98. This shows how as the game is being played, a record of the game, comprising compressed data, is written to database storage. Ben may spectate on the game using a separate Media AppHost 96 which streams the stored game off of database 98 and sends the video/audio stream to client 87d through game service instance 14c, gateway 13b and Internet 12. Decompression of the stored video/audio streams occurs at client 87d.

Note that in this example there are three instances of the basic Client-Service-AppHost configuration: one for gameplay, one for game storage, and a third for spectating (replay).

Figure 8G:
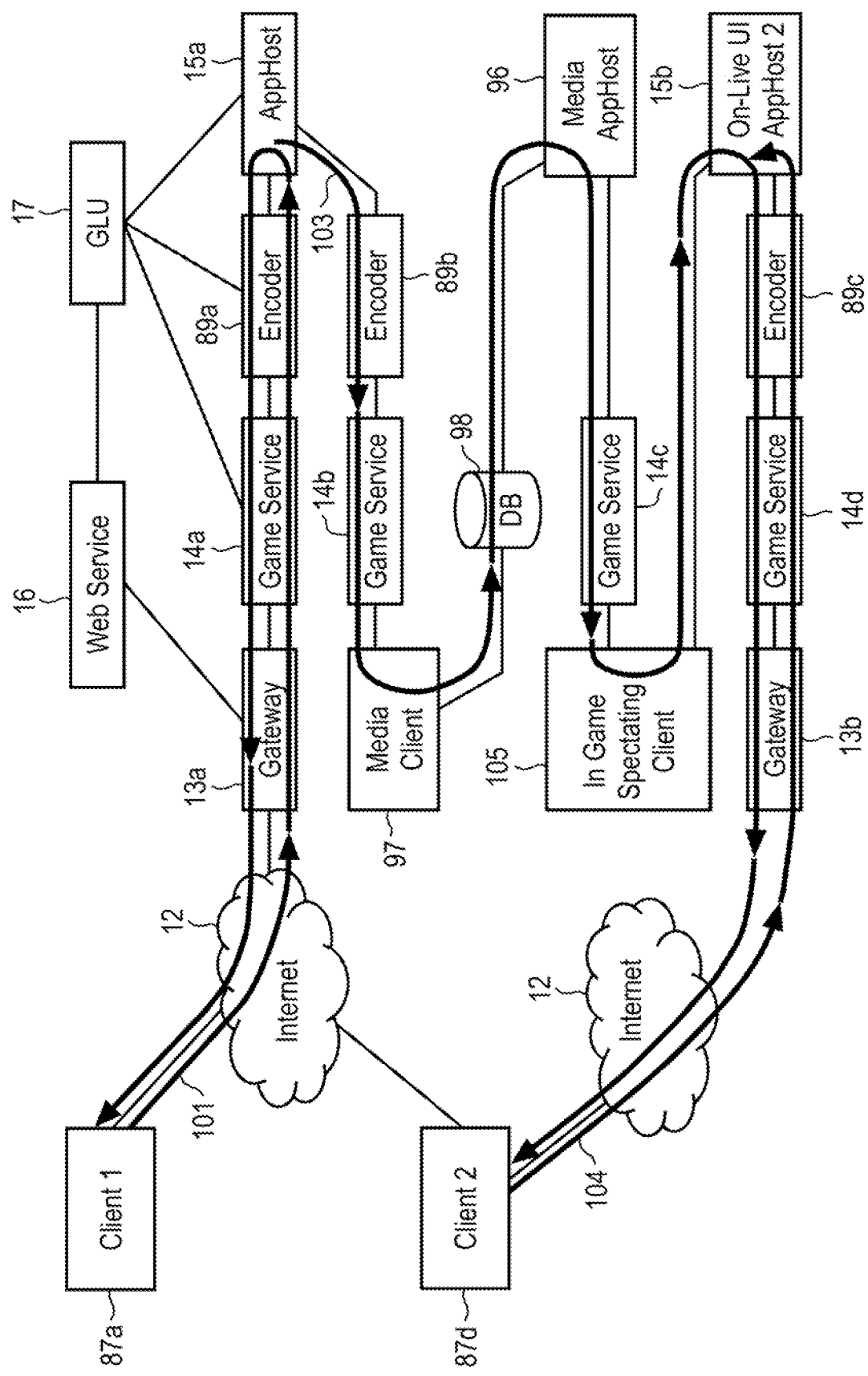
FIG. 8g is a block diagram showing yet another example method of operation for an online video gaming service in a scenario wherein two players are playing separate games and one player is simultaneously spectating on the other player.

FIG. 8g is a block diagram showing yet another example method of operation for an online video gaming service in a scenario wherein two players are playing a collaborative game (e.g., Lego Batman) and one player (Ben) is also spectating on the other player (Nick). For example, Nick and Ben are both playing Lego Batman. Ben may be trying to figure out how to overcome a certain problem or advance to a certain game level, so Ben is playing, he is also spectating on Nick's game using a picture-in-picture feature. The same components shown in FIG. 8f for gameplay and storage of the video/audio streams are also utilized in the example of FIG. 8g. This is shown at the top of FIG. 8g by pathway 101 and the portion of the bottom path from AppHost 15a to database 98. Media AppHost 96 is utilized to read out from database 98 the video/audio streams from Nick's gameplay, which are then provided to an In-Game Spectating client 105 through another instance of game service 14c. In-Game Spectating client 105 generates the picture-in-picture stream that is provided to the User Interface (UI) AppHost 15b, which is running an instance of the game that Ben is playing on.

Practitioners in the art will understand that UI AppHost 15b may, through GLU 17, launch Spectating Client 105 in response to a spectating request received from client 87d transmitted via pathway 104. After UI AppHost 15b receives the picture-in-picture thumbnail from Spectating Client 105, it composites the thumbnail onto a portion of the screen of Ben's game. The single composite video stream is then sent to Ben's client 87d through encoder 89c, game service 14d, gateway 13b, and Internet 12.

Figure 9:
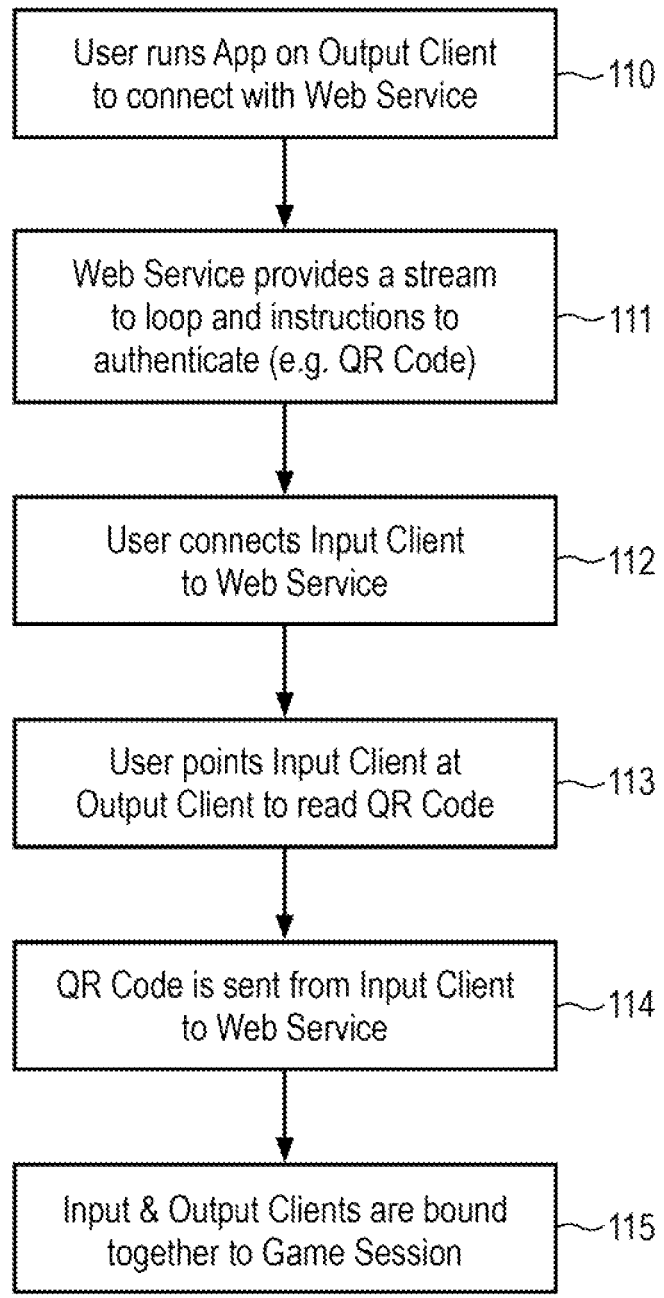
FIG. 9 is an example flow diagram showing of a method of operation for an online video gaming service configured to communicate with split client devices.

FIG. 9 is an example flow diagram showing of a method of operation for an online video gaming service configured to communicate with split client devices. The example process begins with the running of an application on an output client device (block 110), which automatically connects with a web service of the online gaming service system. The running of the application can be user initiated, or automatically initiated upon power up of the output client device. Responsive to communications from the output client, the web service may provide streams to the output client such as advertising, promotions, etc., along with instructions to the user for authentication/synchronization.

(Block 111) In one embodiment a QR code is provided that the user may read with a camera of an input client device. The user first connects the input client device to the web service (block 112) and then reads or captures an image of the QR code displayed on the output client. (Block 113) In one implementation, both of blocks 112 & 113 may be combined in a single step or action.

After reading or imaging the QR code, the input client communicates the QR code back to the web service. This is shown occurring at block 114 in FIG. 9. In response to receiving the correct QR code from input client, the web service binds and synchronizes the input and output devices together for the game or application session (block 115).

It should be understood that elements of the disclosed subject matter may also be provided as a computer program product which may include a machine-readable medium having stored thereon instructions or code which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

The above description of illustrated example embodiments, including what is described in the Abstract, are not intended to be exhaustive or to be limitation to the precise forms disclosed. While specific embodiments and examples of the subject matter described herein are for illustrative purposes, various equivalent modifications are possible without departing from the broader spirit and scope of the present invention.

The invention claimed is:

1. A method for spectating a video game, comprising:
executing a first instance of the video game to generate first data;
executing a second instance of the video game to generate second data;
sending a first stream via a computer network to a first client device, wherein the first stream is generated based on the first data;
accessing overlay data associated with the first data;
combining the overlay data with the second data of the video game to generate composite data; and
streaming a second stream via the computer network to a second client device to facilitate a display of an overlay view within a display of the video game at the second client device, wherein the second stream is generated based on the composite data.

2. The method of claim 1, wherein the first data includes first video data and first audio data, wherein the second data includes the second video data and second audio data, wherein the composite data includes composite video data and composite audio data.

3. The method of claim 1, wherein the first instance of the video game is accessed via a first gaming service, the first instance is executed when the first instance is run by a first server component, the second instance of the video game is accessed via a second gaming service, and the second instance is executed when the second instance is run by a second server component.

4. The method of claim 3, wherein the first gaming service is isolated from the first server component and the second gaming service is isolated from the second server component.

5. The method of claim 1, wherein the first data is encoded to generate the first stream, wherein the first stream includes a first video stream and a first audio stream, wherein the second data is encoded to generate the second stream, wherein the second stream includes a second video stream and a second audio stream.

6. The method of claim 1, wherein the overlay data includes picture-in-picture data, wherein the first data is stored in a storage device, wherein the overlay data is a portion of the first data that is accessed from the storage device.

7. The method of claim 1, wherein said combining the overlay data with the second data includes compositing image data of the overlay data with a portion of video data of the second data, wherein the overlay view includes a thumbnail view overlaid on a portion of an image of the video game displayed on a screen of the second client device.

8. The method of claim 1, wherein the composite data is encoded to generate the second stream.

9. The method of claim 1, wherein the overlay data is a portion of the first data.

10. A system for spectating a video game, comprising:
one or more processors configured to:
execute a first instance of the video game to generate first data;
execute a second instance of the video game to generate second data,
send a first stream via a computer network to a first client device, wherein the first stream is generated based on the first data;
access overlay data associated with the first data;
combine the overlay data with the second data of the video game to generate composite data; and
stream a second stream via the computer network to a second client device to facilitate a display of an overlay view within a display of the video game at the second client device, wherein the second stream is generated based on the composite data; and
one or more storage devices coupled to the one or more processors for storing the overlay data.

11. The system of claim 10, wherein the first data includes first video data and first audio data, wherein the second data includes the second video data and second audio data, wherein the composite data includes composite video data and composite audio data.

12. The system of claim 10, wherein the first instance of the video game is accessed by the first client device via a first gaming service, wherein the one or more processors are configured to run a first server component to execute the first instance, wherein the second instance of the video game is accessed by the second client device via a second gaming service, and wherein the one or more processors are configured to run a second server component to execute the second instance.

13. The system of claim 12, wherein the first gaming service is isolated from the first server component and the second gaming service is isolated from the second server component.

14. The system of claim 10, wherein the one or more processors are configured to encode the first data to generate the first stream, wherein the first stream includes a first video stream and a first audio stream, wherein the one or more processors are configured to encode the second data to generate the second stream, wherein the second stream includes a second video stream and a second audio stream.

15. The system of claim 10, wherein the overlay data includes picture-in-picture data, wherein the first data is stored in a storage device, wherein the overlay data is a portion of the first data, wherein the one or more processors are configured to access the portion of the first data from the storage device.

16. The system of claim 10, wherein to combine the overlay data with the second data, the one or more servers are configured to composite image data of the overlay data with a portion of video data of the second data, wherein the overlay view includes a thumbnail view overlaid on a portion of an image of the video game displayed on a screen of the second client device.

17. The system of claim 10, wherein the one or more processors are configured to encode the composite data to generate the second stream.

18. The system of claim 10, wherein the overlay data is a portion of the first data.

19. A non-transitory computer readable medium containing program instructions for generating an overlay view within a video game, wherein execution of the program instructions by one or more processors of a computer system causes the one or more processors to carry out operations of:

executing a first instance of the video game to generate first data;

executing a second instance of the video game to generate second data;

sending a first stream via a computer network to a first client device, wherein the first stream is generated based on the first data;

accessing overlay data associated with the first data;

combining the overlay data with the second data of the video game to generate composite data; and streaming a second stream via the computer network to a second client device to facilitate a display of the overlay view within a display of the video game at the second client device, wherein the second stream is generated based on the composite data.

20. The non-transitory computer readable medium of claim 19, wherein the operation of combining the overlay data with the second data includes compositing image data of the overlay data with a portion of video data of the second data, wherein the overlay view includes a thumbnail view overlaid on a portion of an image of the video game displayed on a screen of the second client device.

* * * * *